Patented May 8, 1928.

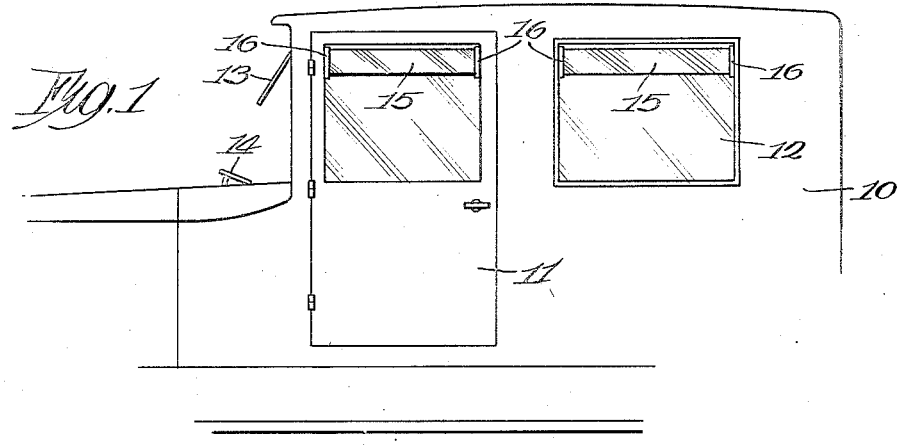
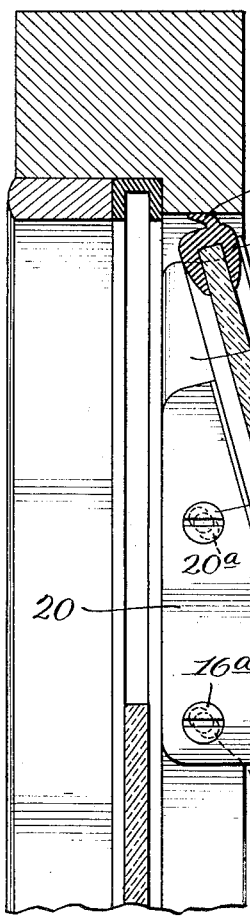
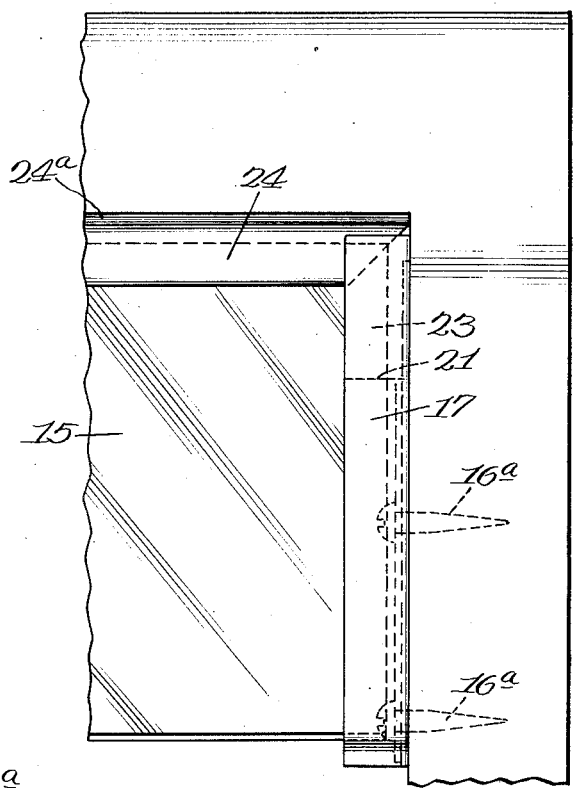

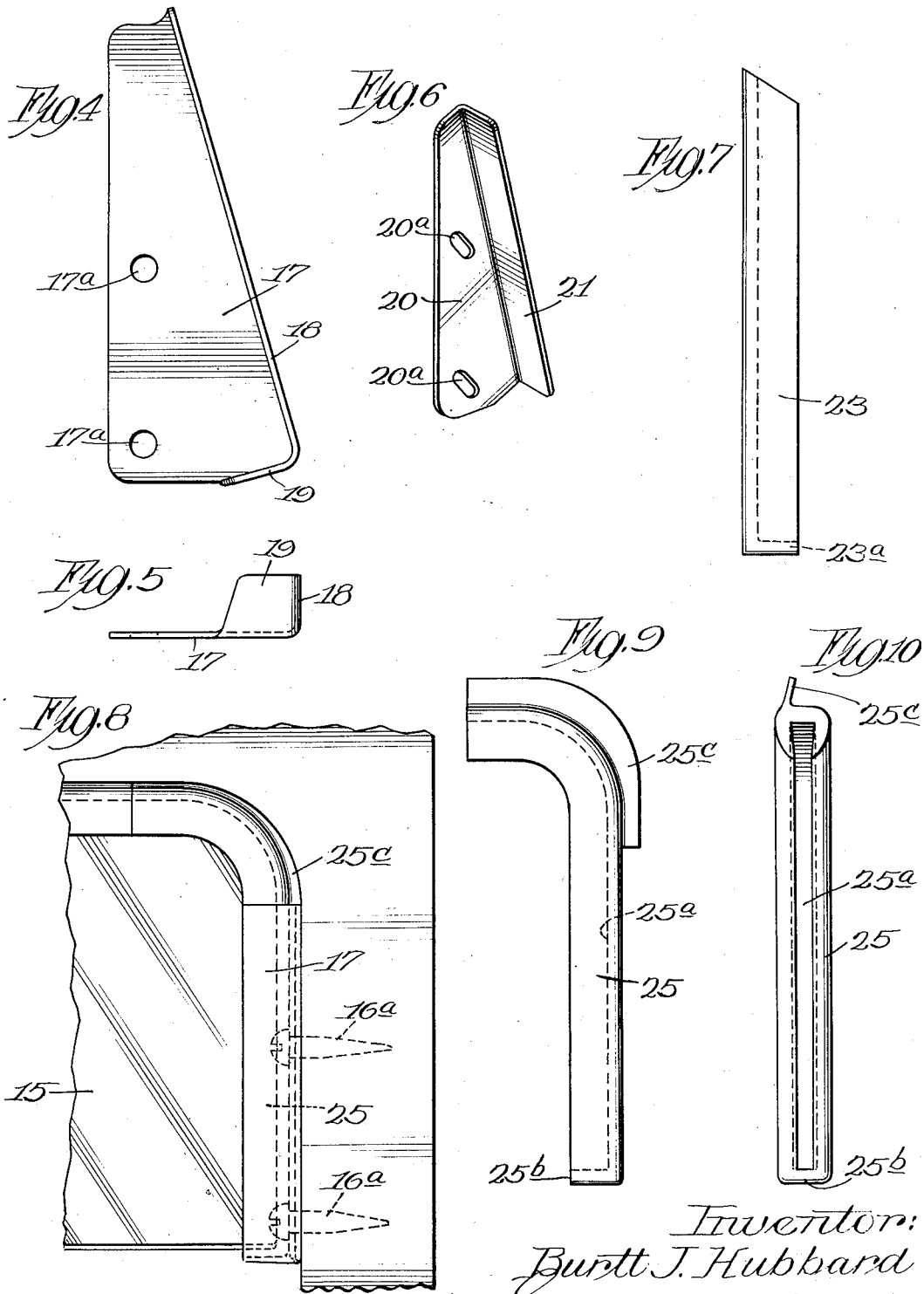

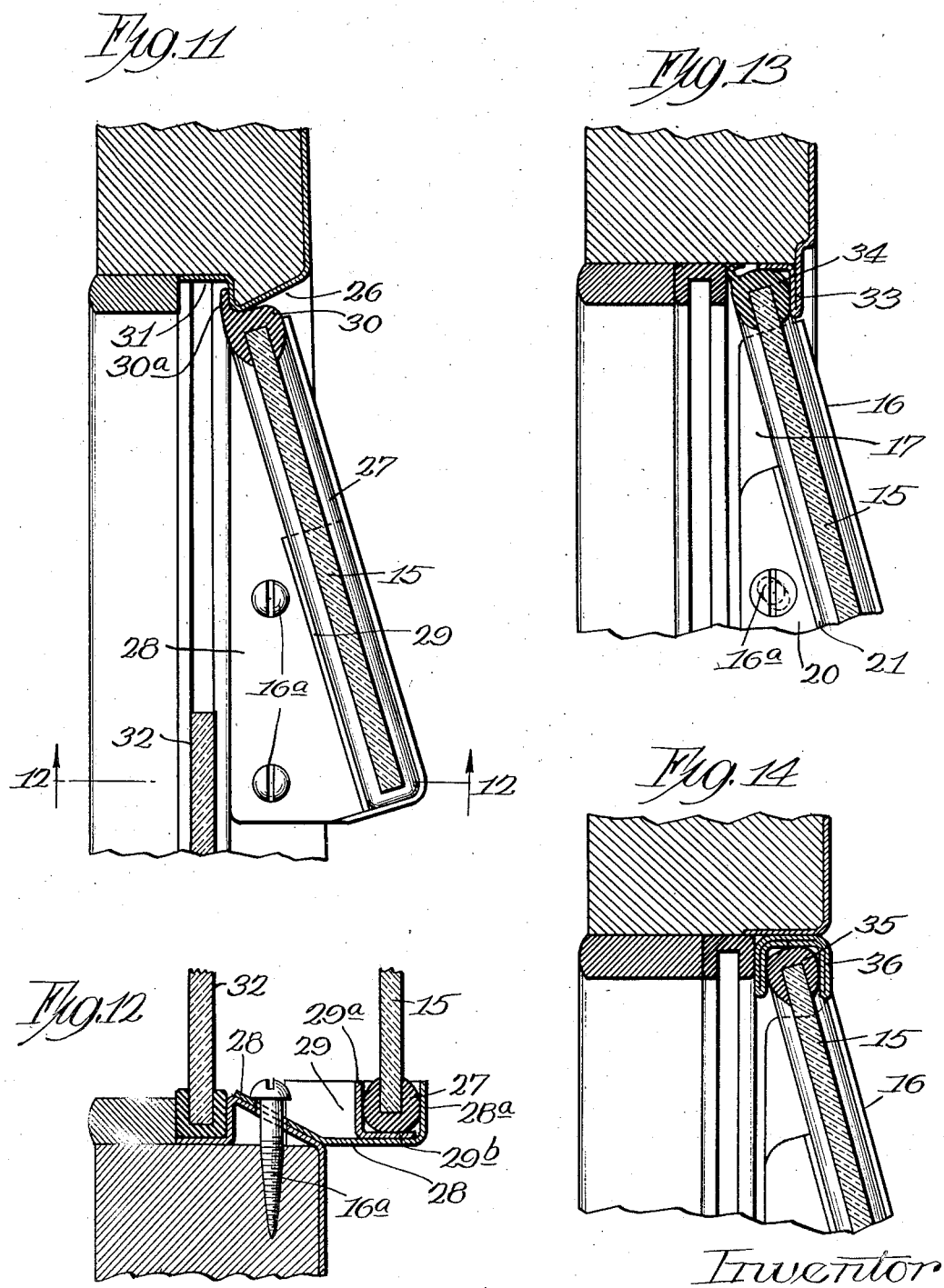

1,669,396

UNITED STATES PATENT OFFICE.

BURTT J. HUBBARD, OF KOKOMO, INDIANA, ASSIGNOR TO HUBBARD PRODUCTS COMPANY, A CORPORATION OF INDIANA.

VENTILATOR FOR MOTOR VEHICLES.

Application filed August 10, 1925. Serial No. 49,188.

This invention relates to improvements in ventilators for motor vehicles.

The principal object of the invention is to provide an improved ventilator adapted to be mounted at the top of a window of a vehicle, such as a closed automobile, which will permit of the proper ventilation of the vehicle through the window when it is lowered for that purpose.

Another object is to provide a ventilator which will prevent entrance of foreign matter through the lowered window.

Another object is to provide a ventilator which will act as an eave whereby a protected area is provided on the window glass immediately beneath the said eave, through which area the driver can see even during a rain-storm when vision through the rest of the window glass is obscured. The eave also, by excluding foreign matters when the window is lowered a few inches below the lower edge of the eave, admits of the proper ventilation of the car during rain-storms and gives the driver a clear view through the opened window.

A further object is to provide a transparent ventilator which will not lessen the available transparent area of the window even when the vehicle is on an inclined or crowned road.

Additional objects relate to means for mounting the ventilator, whereby the same is protected against vibration and shocks incident to travel. Further objects relate to various features of construction and arrangement which will become apparent from a consideration of the following specification and accompanying drawings, wherein Fig. 1 is a fragmentary side elevation of a vehicle showing the window and door equipped with my ventilators.

Fig. 2 is a vertical sectional view through a ventilator installation.

Fig. 3 is a fragmentary front plan view thereof.

Fig. 4 is an elevation of one of the ventilator bracket members.

Fig. 5 is an end view of the bracket member shown in Fig. 4.

Fig. 6 is a perspective view of another bracket member.

Fig. 7 is an elevation of one form of resilient member which forms a cushion mounting for the ventilator glass.

Fig. 8 is a fragmentary front elevation of a ventilator installation in which the window corner is shown as somewhat rounded.

Fig. 9 is a plan view of a resilient mounting member adapted for use with a window having round corners, such as shown in Fig. 8.

Fig. 10 is a side elevation of the member shown in Fig. 9.

Fig. 11 is a vertical sectional view through a ventilator installation showing the adaptation of my invention to a window the frame of which is beveled.

Fig. 12 is a sectional view taken on line 12—12, Fig. 11.

Fig. 13 is a fragmentary sectional view of a further modification of my invention, and Fig. 14 is an additional form thereof.

Similar reference characters are used to designate like elements in all the views.

In Fig. 1, an automobile body 10 is shown (fragmentarily) which body is provided with the usual door 11 and window 12, each of which may be provided with one of my ventilators hereinafter described. The vehicle is provided with a windshield 13, which may be opened for purposes of ventilation, as may also the cowl ventilator 14.

As shown more particularly in Figs. 2 and 3, the ventilator comprises a glass 15, which is supported at each end by a bracket indicated, generally, by numeral 16. The brackets 16 comprise outer bracket members 17, shown in detail in Fig. 4, each of which members is preferably formed of sheet metal, and is provided with a front flange 18 and lower flange 19. A second bracket member 20, shown in detail in Fig. 6, has an upturned flange 21 which is disposed in parallel relation with flange 18 when members 17 and 20 are in operative relation. As shown in Fig. 2, bracket members 17 and 20 are secured to the side or stile of the window opening by means of screws 16ᵃ which pass through registering holes 17ᵃ and 20ᵃ in the bracket members. The holes 20ᵃ of member 20 are slightly elongated in the direction of a line forming an angle of 45° with the vertical, as shown in Fig. 6, for a purpose hereinafter to be explained.

A resilient strip 23, preferably formed of rubber, is shown in Fig. 7, which strip is channeled to receive the end of a glass 15. The channel is closed at the bottom, as shown, thereby forming a resilient support 23ᵃ which protects the glass from contact with flange 19 of the outer bracket member 17. As will be seen in Fig. 2, the end of the glass 15 rests in the channel of the mounting strip 23, which strip is positioned within the channel formed between flanges 17 and 21. It is desirable that bracket member 20 be adjustable to a slight extent to accommodate variations in glass thickness, etc., and for this reason the screw holes 20ª in member 20 are elongated, as above described. It will be seen that the elongation of the holes permits member 20 to be moved slightly downwardly and to the right before screws 16ª have been tightened, whereby said member 20 can be forced firmly against the resilient mounting strip 23. The diameter of the screws is approximately the same as the small diameter of the elongated holes, and since the force exerted by the compressed rubber strip 23 acts in a direction at right angles to the plane of the flange 21 the likelihood of such force, or the vibration of the car displacing the member 20 is minimized.

The resilient mounting member or strip 23 is particularly adapted for installation of a ventilator on a window having square corners, and the upper mitered end thereof coacts with a similarly shaped end of a top or upper resilient strip 24 to tightly close the corners of the window, as will be seen. The upper strip 24 extends the full length of the glass 15, and is formed preferably with an upwardly projecting flange or rib 24ª, which contacts with the upper frame of the window. This flange 24ª forms a seal between the glass 15 and the upper part of the window, whereby dust and rain, etc., are excluded. This construction of strip 24 accommodates the ventilator installation to variations in the width of glass and to any slight irregularities in the portion of the window frame with which the strip contacts and also acts as a cushion for the glass.

In Fig. 8, a window having a somewhat rounded corner is shown provided with my ventilator. The glass 15 may be somewhat rounded at its upper corners to conform to the shape of the window opening, but the bracket members 17 and 20 may be the same as above described. In connection with windows having rounded corners, however, I prefer to use mounting strips for enclosing the ends of the glass such as are illustrated in Figs. 9 and 10. This form of mounting strip 25 is provided with a channel 25ª for receiving the end of the glass, which channel is closed at the bottom, as shown in Fig. 9, by end 25ᵇ for protecting the lower edge of the glass from contact with the metal bracket. The curvature of strip 25 conforms approximately to the curvature of the corners of the window. Since this curvature of the strip, or of the window may vary somewhat in actual practice, the upper portion of the strip 25 is provided with a flange or rib 25ᶜ as shown, which, being flexible, will completely fill the window corners and form a tight fit, said rib terminating adjacent the top of the particular bracket with which it is used. The top of the glass 15 is provided with a resilient mounting strip of the form previously described, the upper rib thereof co-operating with the upper portions of ribs 25ᶜ to form a seal between the top portion of the window frame and the ventilator, as will be seen. The strips 23 and 25 are rounded somewhat on their back portions, whereby the strips can accommodate any unevenness in the brackets, such as slight bends in the flanges thereof and adapts itself to the glass regardless of the angle of the bracket.

In Figs. 11 and 12, my ventilator is shown installed on a vehicle window, the frame of which is beveled, as shown at 26. The glass 15 has its ends supported in rubber mounting members 27 which may be of either form previously described, depending on the shape of the window corners. The outer bracket member 28 having a flange 28ª is secured by screws 16ª to the inner or beveled surface of the frame, the bracket member being shaped to conform with the bevel of the frame. The inner bracket member 29 has a flange 29ª which co-operates with the flange 28ª to form a channel for the reception of the strip 27. Member 29 is secured to the outer bracket 28 by spot-welding the inturned flange 29ᵇ to the member 28, altho it may be riveted or anchored otherwise. The upper edge of the glass 15 is provided with the resilient strip 30 having an upper rib 30ª which projects into the groove 31, which the window glass 32 enters when the window is closed. The upper portion of strip 30 is pressed firmly against the lower surface of the window frame, whereby foreign matters are excluded, and a resilient mounting is secured. Inasmuch as bracket member 29 is wider at the bottom than at the top, the same, when secured to the window, will be inclined slightly from the vertical position. The glass 15 therefore used with this type of bracket will be somewhat longer at the bottom than at the top.

In Fig. 13, the metal of the automobile body above the window is projected downwardly into the window opening and is folded back upon itself to form a flange 33 in the rear of which is positioned the upper mounting strip 34. The bracket construction may be of either type previously described. The flange 33 is a shield for protecting the strip 34 from exposure to the sun and elements, thus prolonging the life of strip 34, and also enhancing the appearance of the ventilator installation, since the brackets will, as a rule, be finished to correspond to the finish of the car.

In Fig. 14, a further modification is shown in which the upper mounting strip 35 is shown positioned in the channel formed by a metal channel member 35 which may be secured to the rail of the window by any approved means. The finish of the member 36 may correspond to the finish of the car body and to the finish of the brackets, which are of either form previously described. The member 36 thus hides the mounting strip 35 from view and as a shield protects the same from deterioration.

The ventilator glass 15 of the forms of my invention, above described, are somewhat inclined, as shown, thus forming eaves or watersheds for the windows with which the same are associated. During a rain-storm, for instance, the ventilator will, if the window is closed, maintain a strip of the window immediately below the lower edge of the ventilator free from rain. If each window of the vehicle is provided with a ventilator, the driver will have a belt of clear glass through which unobscured vision to sides of the car can be had. If the windows, equipped with my ventilators, are opened a few inches below the lower edge of the ventilator, rain will be excluded, a clear view through each window will be had and the car can be properly ventilated. Inasmuch as the ventilators do not lessen the lighting area or visibility through the windows to which they are attached, because the body of the ventilator is of glass, the driver's view will not be obstructed by the ventilators on the lower side of the car when the latter is on a crowned or banked road.

Motor vehicles, as commonly constructed, are provided with windshields, such as is shown diagrammatically at 13 in Fig. 1. When the windshield 13 or cowl ventilator 14 is opened, air is admitted to the car and finds exit through the lowered window 12 provided with my ventilators. With the rear windows equipped with my ventilators, this objectionable feature in car ventilation can be largely overcome. To avoid the entrance of dust, the windshield and cowl ventilator are closed and the windows in the car door 11 are opened as are the rear windows 12 equipped with my ventilators. Air is admitted through the windows in doors 12 and to some extent through the cracks around the doors and passes from the car through the rear windows. The dust which would pass through the windshield, if opened, is thrown outwardly by the forward movement of the car, and thus cannot enter through the forward windows, nor can it enter the rear windows since the air flows outwardly beneath the ventilators with sufficient force to prevent such entrance. Both the rear windows and the windows in the doors of the vehicle can be equipped with the ventilators, if desired, and improved ventilation will be secured. The ventilator projects but slightly beyond the side of the vehicle, preferably not farther outwardly than the door hinges. The ventilators on the doors thus do not interfere with the full opening thereof, as will be clear.

Although I have shown various modifications of my improvements for the purposes of illustration, it will be seen that changes may be made therein without departing from the spirit of the invention, and I do not wish to be restricted to the modifications here shown and described, except where limitations thereto appear in the appended claims.

What I claim is:—

1. A ventilator for motor vehicles comprising a glass member, and means for supporting the same adjacent the top of a window of said vehicle, said means comprising a pair of brackets, each bracket comprising an outer bracket member, an inner bracket member co-operating therewith, said members having registering holes, and screws passing through said registering holes for securing said members to the sides of the window frame, the holes of said inner bracket member being elongated to permit of adjustment of said member with reference to said glass, the elongation of said holes being in a direction to resist forces at right angles to said glass tending to loosen said inner member.

2. A ventilator for motor vehicles comprising a glass member disposed in an inclined position adjacent the top of the vehicle window to form an eave therefor, resilient mounting strips engaging the ends and top edge of said glass, said strips having ribs thereon, and a pair of brackets for supporting said glass in position, said strips serving to protect said glass from contact with said brackets and to make resilient contact with the corners of said window and with the top rail thereof, said strips and ribs being sufficiently flexible to form a seal between the top edge and upper corners of said glass and said adjacent portions of said window frame, said strips and ribs serving also as a resilient mounting to accommodate irregularities in said glass, brackets and window frame and to protect said glass against breakage.

3. In a window ventilator for vehicles, the combination of a glass member, brackets for supporting said member adjacent the upper portion of a vehicle in fixed relation to the window opening, and resilient strips between the ends of said glass and said brackets and between the top edge of said glass and the top rail of the window frame, said strips being provided with longitudinal ribs adapted to make resilient contact with portions of said window frame.

4. A ventilator comprising a pair of complementary bracket members adapted to be attached to the side of a vehicle body adjacent the upper end of a window thereof, each member having an edge bent to form an outer flange, a second shorter flange spaced from and disposed in parallel relation with said first flange and defining a channel therebetween, said first flange being continued along the lower edge of said bracket member to form a support at the lower end of said channel, a glass ventilator, and resilient means on each end and the upper edge thereof, said ventilator having its ends positioned in said channel and resting on said supports, said resilient means protecting the glass from direct contact with the brackets and providing a seal between the upper edge of the glass and a portion of the vehicle body.

5. Ventilating means for the side windows of automobiles, in which a panel of glass having no reinforcement at its upper edge may be lowered to provide an opening at the top, comprising a pair of sheet metal brackets having means to secure them in substantially parallel relation in the window frame at the top of the window opening, each bracket having its outer edge sloping downwardly and outwardly and having a flange arranged at right angles thereto and projecting toward the other bracket, a second flange shorter than the first flange and spaced therefrom in parallel relation, a rubber channel member received between said flanges and being closed at the bottom, a transverse flange at the bottom of the first flange to support said rubber channel member and a transverse strip of glass having its opposite ends received within said channel members and supported by said brackets and flanges but out of contact therewith, said glass strip having no reinforcement along its lower edge whereby vision through the same and through the said glass panel is unobstructed.

6. A bracket for a vehicle ventilator comprising a body member adapted to be secured in a window opening and to project outwardly therefrom, said member having an outer flange, a second flange parallel with said first flange, said flanges defining a channel for receiving the end of a glass ventilator and a third flange extending transversely of said channel at the lower end thereof for supporting the glass ventilator, said last named flange being integral with said body member.

In testimony whereof, I have subscribed my name.

BURTT J. HUBBARD.